A. MESSMER.
ALTAR BREAD BAKER.
APPLICATION FILED NOV. 26, 1915.
1,257,513.
Patented Feb. 26, 1918.
2 SHEETS—SHEET 1.
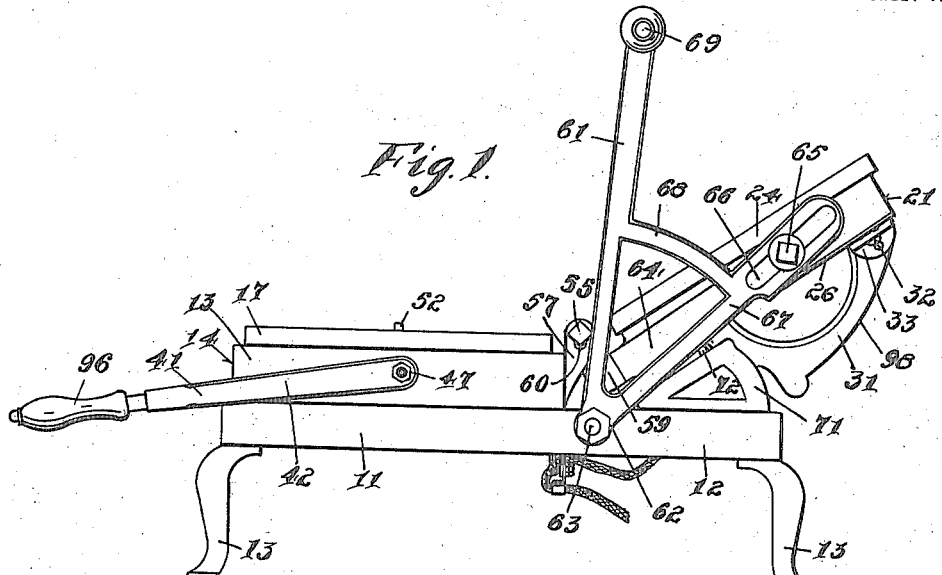
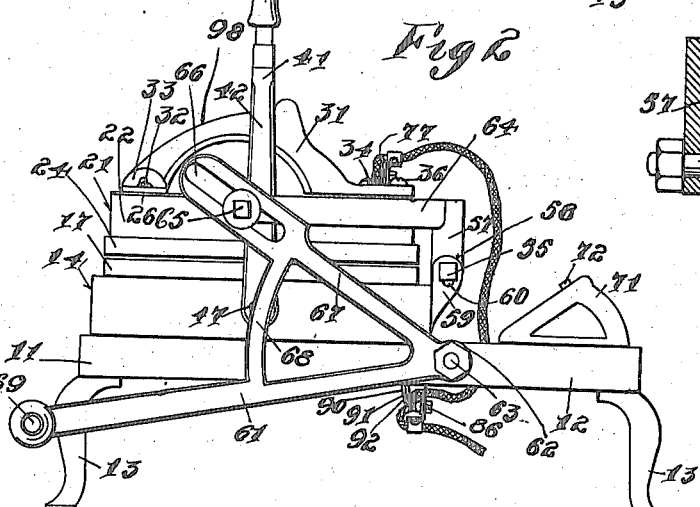
Witnesses
W. E. Splain
Theresa M. Silber
Inventor
Andrew Messmer,
by his Attorney

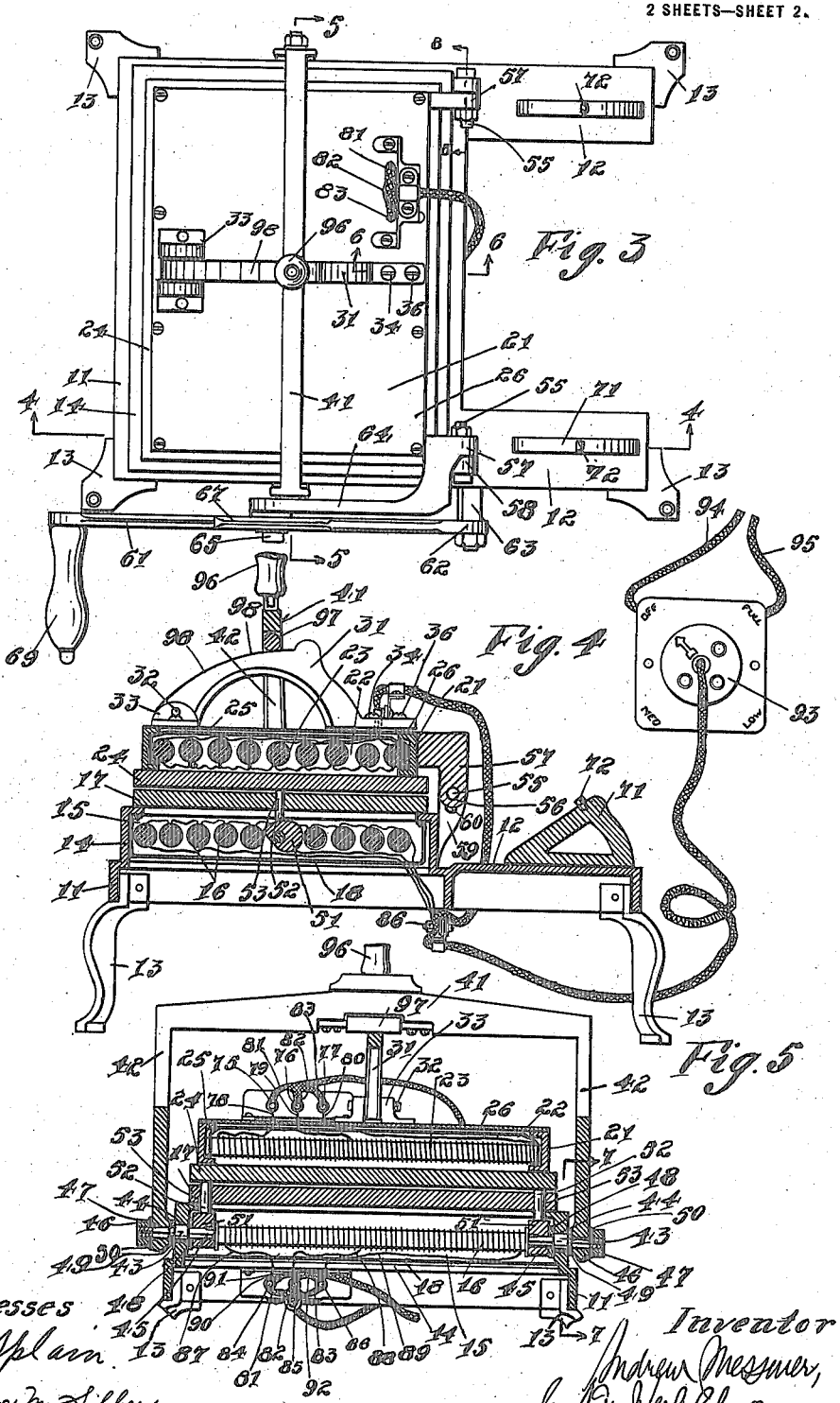

UNITED STATES PATENT OFFICE.

ANDREW MESSMER, OF CINCINNATI, OHIO.

ALTAR-BREAD BAKER.

1,257,513.　　　　　　　Specification of Letters Patent.　　Patented Feb. 26, 1918.

Application filed November 26, 1915.　Serial No. 63,530.

*To all whom it may concern:*

Be it known that I, ANDREW MESSMER, a citizen of the United States, residing at Cincinnati, in the county of Hamilton and State of Ohio, have invented certain new and useful Improvements in Altar-Bread Bakers, of which the following is a specification.

Altar bread is usually baked openly in a room, and it is one of the objects of my invention therefore to provide a machine for this character of baking in which fumes are practically avoided.

It is also desired in baking altar bread that the bread shall be very thin and thoroughly baked throughout.

It is therefore the object of my invention further to provide a baker for baking of this character so arranged that the dough is evenly distributed between a pair of baking-plates, and relative movement imparted between the plates so that the plates shall first be laid one above the other substantially equidistant throughout their areas and so that further pressure may be applied for causing approach between the plates while the spacing means between the plates are simultaneously withdrawn.

It is the object of my invention, further, to provide a baker of the character mentioned in which the baking heat is applied to both baking-plates, throughout the time that the baker is in use, whether or not the movable baking-plate is in baking position, and to provide a novel arrangement of means for supplying heat of various intensities to the baking-plates.

The invention will be further readily understood from the following description and claims, and from the drawings, in which latter:

Figure 1 is a side elevation of my improved device in open relation.

Fig. 2 is a similar view of the same in closed relation.

Fig. 3 is a plan view of the same in closed relation.

Fig. 4 is a vertical cross-section of my improved device, taken on the line 4—4 of Fig. 3.

Fig. 5 is a vertical longitudinal section of the same on the line 5—5 of Fig. 3.

Fig. 6 is a sectional detail of the means for adjusting the arc-piece, taken on the line 6—6 of Fig. 3.

Fig. 7 is a sectional detail of the pivot bearing for the clamp-yoke, taken on a line corresponding to the line 7—7 of Fig. 5; and, Fig. 8 is a sectional detail of the trunnion connection for the swinging heater taken on the line 8—8 of Fig. 3.

My improved baker is a portable baker arranged to be placed in a suitable position, so that the baking can be viewed and be in exposed relation in the room.

11 is a suitable base having rearward extensions 12 and supported on suitable legs 13. The base has thereon a heater 14 which is provided with a heating compartment 15, in which there are electric resistance wires 16 comprising sets of resistance wires, under a baking-plate 17, the resistance wires being electrically insulated by suitable insulating sheets 18.

21 is a swinging heater, comprising a heating compartment 22, in which there are electric resistance wires 23, comprising sets of resistance wires, arranged for heating a baking plate 24 located thereunder, the resistance wires being electrically insulated by suitable insulating sheets 25. A closing plate 26 closes the top of the swinging heater.

An arc-piece 31 is hinged at 32 to lugs 33 on the normal top of the swinging heater 21, and extends rearwardly crosswise of the swinging heater, being adjustably secured to the swinging heater at the pivoted end of the latter by means of an adjusting screw 34 having threaded connection 35 with the arc-piece and impinging the swinging heater, for adjusting the relation of the swinging end of the arc-piece with the swinging-heater, a clamp-screw 36 passing through a hole 37 in the arc-piece and having threaded connection 38 with the swinging heater, for clamping the arc-piece in adjusted positions.

A clamp-yoke 41 has side arms 42 pivoted to the base. The pivoting is instanced as accomplished by means of bushings 43 journaled in bearings 44 in the respective side walls of the base. Shafts 45, instanced as square shafts, pass through similar shaped bores in the bushing, the side-arms 42 having bearings 46 with similar bores received over the shafts, being held thereon by nuts 47, washers 48, 49, 50, being received about the shaft.

Cams 51 are rigidly secured to the inner ends of the shafts 45 and rock with said shafts when the latter are rocked by the clamp-yoke.

Abutment-pins 52 are arranged to be raised and lowered by the cams 51 in bearings 53 in the baking-plate 17, and are arranged to be contacted by the swinging heater when the latter is lowered upon the lower heater.

The swinging heater is provided with trunnions 55 shown as trunnion bolts secured in bearings 56 on depending lugs 57 extending rearwardly from the swinging heater. The trunnions are journaled in bearings 58 on lugs 59 extending rearwardly and upwardly from the lower heater.

The trunnions are preferably movable up and down in one of each of the mating bearings 56, 58, instanced as accomplished by passing the trunnion bolts through slots 60 in the bearings 58.

An operating arm 61 for swinging the swinging heater is pivoted by a bearing 62 on a lug 63, extending from the base. The swinging heater is provided with an arm 64. There is a pin and slot connection between the arms 61, 64, shown as a bolt 65 secured in the forward end of the arm 64 coacting with the walls of a slot 66 in a branch 67 of the operating arm, braced to the main member of the operating arm by means of a brace 68. The operating arm has a handle 69.

The rearward extensions 12 are provided with inclined supports 71, in which cushion knobs 72, for instance of insulating material, are located, the swinging heater resting upon the cushion knobs when the machine is open.

Electric connections are made with the electric heaters in such manner as to impart various intensities of heat thereby and to permit the swinging of the swinging heater without interruption of the electric current.

Thus the swinging heater is provided with binding posts 75, 76, 77, from which electric conducting wires 78, 79, 80, lead to the various resistance coils in the swinging heater. Flexible electric conductors 81, 82, 83, lead from the binding posts 75, 76, 77, to binding posts 84, 85, 86, on the base of the machine. Electric conductors 87, 88, 89, lead from the latter binding posts to the resistance coils in the lower electric heater. Electric conducting wires 90, 91, 92, connect with the respective electric conducting wires of the lower electric heater and the upper or swinging electric heater, accomplished preferably by connecting said electric conducting wires with the binding posts 84, 85, 86, the electric conducting wires 90, 91, 92, being also instanced as connecting with a suitable three-point plug switch 93, with which suitable service wires 94, 95, are connected, the arrangement being such that the electric circuit with both electric heaters may be simultaneously interrupted or low, medium or full heat respectively imparted simultaneously by both heaters.

In operating my baker the clamp-yoke 41 is swung forwardly by means of its handle 96, whereby the cams 51 are rocked for raising the pins 52. The operating arm 61 is then swung rearwardly, whereby the swinging heater is swung upon its pivots rearwardly for resting upon the cushion knobs 72.

Dough is now placed upon the lower heating plate 17, which is provided with suitable insignia. The upper heating plate 24, also provided with suitable insignia, is now swung into position above the lower heating plate, but spaced therefrom, due to the abutment pins 52 and the spaced pivotal connection of the swinging heater, thereby preventing an undue compression of the dough adjacent to the pivotal point of the swinging heater, the swinging heater being supported upon the abutment pins. The clamp-yoke is now raised in order to bring the idler roller 97 thereon into coaction with the arc-face 98 on the arc-piece 31, this arc-face being eccentric to the pivot of the clamp-yoke, so that the farther the clamp-yoke is moved rearwardly, the greater will be its clamping effect upon the upper or swinging heater.

The movement of the clamp-yoke toward clamping position causes rocking of the cams 51 for permitting descent of the abutment-pins and approach between the baking-plates for exerting pressure upon the dough between the baking-plates, this pressure, however, being a uniform pressure throughout the areas of said baking-plates, owing to the spaced pivotal connection of the swinging heater and the movement of the abutment-pins corresponding to the clamping movement of the clamp-yoke, for spreading the dough evenly between the baking-plates.

The recession of the successive points in the arc-faces of the cams 51 coacting with the pins 52, during clamping movement of the clamp-yoke, corresponds to the increase in height of the successive points in the cam-face 98 contacted by the roller 97, so that during the pressing action upon the dough, the weight of the swinging plate is primarily supported by the abutment-pins, insuring an even but not undue pressure on the dough throughout the areas of the baking-plates, and a consequent even and tender baking of the altar bread, this even baking being further insured by the continued heating of the upper and lower baking-plates by means of the electric resistance conductors, whether the device be in open, closed, or in partially open relation.

Having thus fully described my invention, what I claim as new and desire to secure by Letters Patent, is:

1. In an altar bread baker, the combination of a lower baking-plate, a swinging baking-plate coöperating therewith, separating means between said baking-plates constructed and arranged to separate said baking plates prior to co-clamping thereof, to prevent undue compression of the dough between said baking plates, and clamping means for clamping said baking-plates one toward the other, said separating means and clamping means being connected for combined movements for causing recession of said separating means during clamping movement of said clamping means and separating movement of said separating means during unclamping movement of said clamping means.

2. In an altar bread baker, the combination of a lower baking-plate, a swinging baking-plate coöperating therewith, said swinging baking-plate provided with a cam-face, a clamp-yoke coöperating with said cam-face, and an additional cam actuated by said clamp-yoke, said additional cam controlling the spacing between said baking-plates during said clamping movement for causing recession of said cam during clamping movement of said clamp-yoke and separating movement of said cam during unclamping movement of said clamp-yoke in related progression.

3. In an altar bread baker, the combination of a lower heater comprising a baking-plate, a swinging heater comprising a baking-plate coöperating with said first-named baking-plate, an arc-piece on said swinging heater, a clamp-yoke pivoted to said lower heater coöperating with said arc-piece, separating pins in said lower heater coacting with said swinging heater prior to clamping movement of said clamp-yoke and acting to separate said swinging baking-plate from said first-named baking-plate to prevent undue compression of the dough between said baking-plates, and cams having operative connection with said clamp-yoke for moving said separating pins during movement of said clamp-yoke for clamping said baking-plates one toward the other and during movement of said clamp-yoke for unclamping said baking-plates.

4. In an altar bread baker, the combination of a lower heater, a swinging heater coacting therewith, spaced pivot-connections between said heaters, an arc-piece on said swinging heater, a clamp-yoke having a pivotal axis positioned with relation to said lower heater and coacting with said arc-piece for causing clamping action between said heaters, said clamp-yoke provided with cams arranged to space said swinging heater from said lower heater prior to clamping movement of said clamp-yoke, said clamp-yoke controlling the distance between said heaters in accord with the clamping movement of said clamp-yoke.

In testimony whereof, I have hereunto signed my name in the presence of two subscribing witnesses.

ANDREW MESSMER.

Witnesses:
 CHARLES E. WEBER,
 THERESA M. SILBER.